United States Patent
Sandoz et al.

(10) Patent No.: US 8,327,365 B2
(45) Date of Patent: Dec. 4, 2012

(54) THROTTLING OF AN INTERATIVE PROCESS IN A COMPUTER SYSTEM

(75) Inventors: Eric S. Sandoz, Concord, CA (US); Robert S. Richardson, Sachse, TX (US)

(73) Assignee: Bank of America Corporation, Charlotte, NC (US)

( * ) Notice: Subject to any disclaimer, the term of this patent is extended or adjusted under 35 U.S.C. 154(b) by 881 days.

(21) Appl. No.: 12/437,106

(22) Filed: May 7, 2009

(65) Prior Publication Data

US 2010/0287558 A1  Nov. 11, 2010

(51) Int. Cl.
*G06F 9/46* (2006.01)
*G06Q 10/00* (2012.01)
(52) U.S. Cl. .......................................... 718/102; 705/1.1
(58) Field of Classification Search ................... 718/102; 705/1.1
See application file for complete search history.

(56) References Cited

U.S. PATENT DOCUMENTS

| | | | |
|---|---|---|---|
| 2007/0234363 A1* | 10/2007 | Ferrandiz .................... | 718/101 |
| 2008/0000962 A1 | 1/2008 | Cantley et al. | |
| 2009/0112518 A1 | 4/2009 | Armstrong et al. | |
| 2009/0113434 A1 | 4/2009 | Podila | |
| 2009/0216608 A1* | 8/2009 | Bechtel ...................... | 705/10 |
| 2010/0063927 A1* | 3/2010 | Davis et al. ................. | 705/44 |

OTHER PUBLICATIONS

International Search Report and Written Opinion of the International Searching Authority in re International Application No. PCT/US10/34057, filed May 7, 2009.

* cited by examiner

*Primary Examiner* — Meng An
*Assistant Examiner* — Blake Kumabe
(74) *Attorney, Agent, or Firm* — Michael A. Springs; Moore & Van Allen PLLC; James C. Edwards

(57) ABSTRACT

Throttling of an iterative process in a computer system is disclosed. Embodiments of the present invention focus on non-productive iterations of an iterative process in a computer system. The number of productive iterations of the iterative process during a current timeframe is determined while the iterative process is executing. A count of the number of process starts for the iterative process during the current timeframe is stored. The count can be normalized to obtain a number of units of work handled during the current timeframe. A throttling schedule can be calculated, and the throttling schedule can be stored in the computer system. The throttling schedule can then be used to determine a delay time between iterations of the iterative process for a new timeframe. A formula can be used to calculate the throttling schedule. The throttling schedule can be overridden in accordance with a service level agreement (SLA), as well as for other reasons.

19 Claims, 5 Drawing Sheets

THROTTLING OF AN INTERATIVE PROCESS IN A COMPUTER SYSTEM

BACKGROUND

Computing intensive tasks in some enterprises rely on large, "mainframe" computer systems. With such as system, the cost of operation is directly related to the number of millions of instructions per second (MIPS) that the system is required to execute. Thus, reducing costs is possible by reducing MIPS for a given task, and such a reduction in MIPS is often referred to as "run-time" improvement, since the reduction is manifested when the task actually "runs" on the computer system. Identifying and eliminating software inefficiencies is a traditional way of making run-time improvement for a given task. In theory, if the software is made more efficient, the same calculations can be performed with fewer MIPS.

SUMMARY

Embodiments of the present invention focus on non-productive iterations of an iterative process in a computer system. By focusing on non-productive iterations, it may be possible to reduce MIPS resources used by an iterative process where the tasks performed at each iteration are already highly efficient. For example, despite their efficiency, iterative processes may waste MIPS looking for work to do when no work is available.

In example embodiments, a method of throttling an iterative process in a computer system includes counting a number of process starts for the iterative process during a current timeframe while the iterative process is executing. A count of the number of process starts is then normalized to determine the average number of units of work handled during the timeframe. A throttling schedule can be calculated using the number of units of work processed and the throttling schedule can be stored in the computer system. The throttling schedule can then be used to determine a delay time between iterations of the iterative process for a new timeframe. In example embodiments, the new timeframe corresponds to the old timeframe, for example, the new timeframe may be a Tuesday and the current timeframe, or old timeframe, may be or have been Tuesday a week ago.

In some embodiments, a look-up table or formula is used to calculate the throttling schedule, in part from the number of units of work processed. In some embodiments, the throttling schedule can be overridden in accordance with a service level agreement (SLA), in part by referring to a stored SLA table. Non-standard timeframes can also be taken into account, and provision can be made for operator initiated extended delay overrides. An extended delay override indicator can be set and the throttling schedule can be overridden when the extended delay override indicator is set. A log can be kept of the extended delay overrides.

A system used to implement an embodiment of the invention can include a computing platform to execute the iterative processes, count a number of process starts for an iterative process during a current timeframe to calculate and store a throttling schedule, and use the throttling schedule to determine a delay time between iterations for a new timeframe. Storage media can be connected to the computing platform to store the throttling schedule, a service level agreement (SLA) table, and a count of the process starts for the iterative process controller. Computing resources that make up the system of the invention in combination with appropriate, executable computer program code can provide the means to implement an embodiment of the invention.

DETAILED DESCRIPTION

Figure 1:
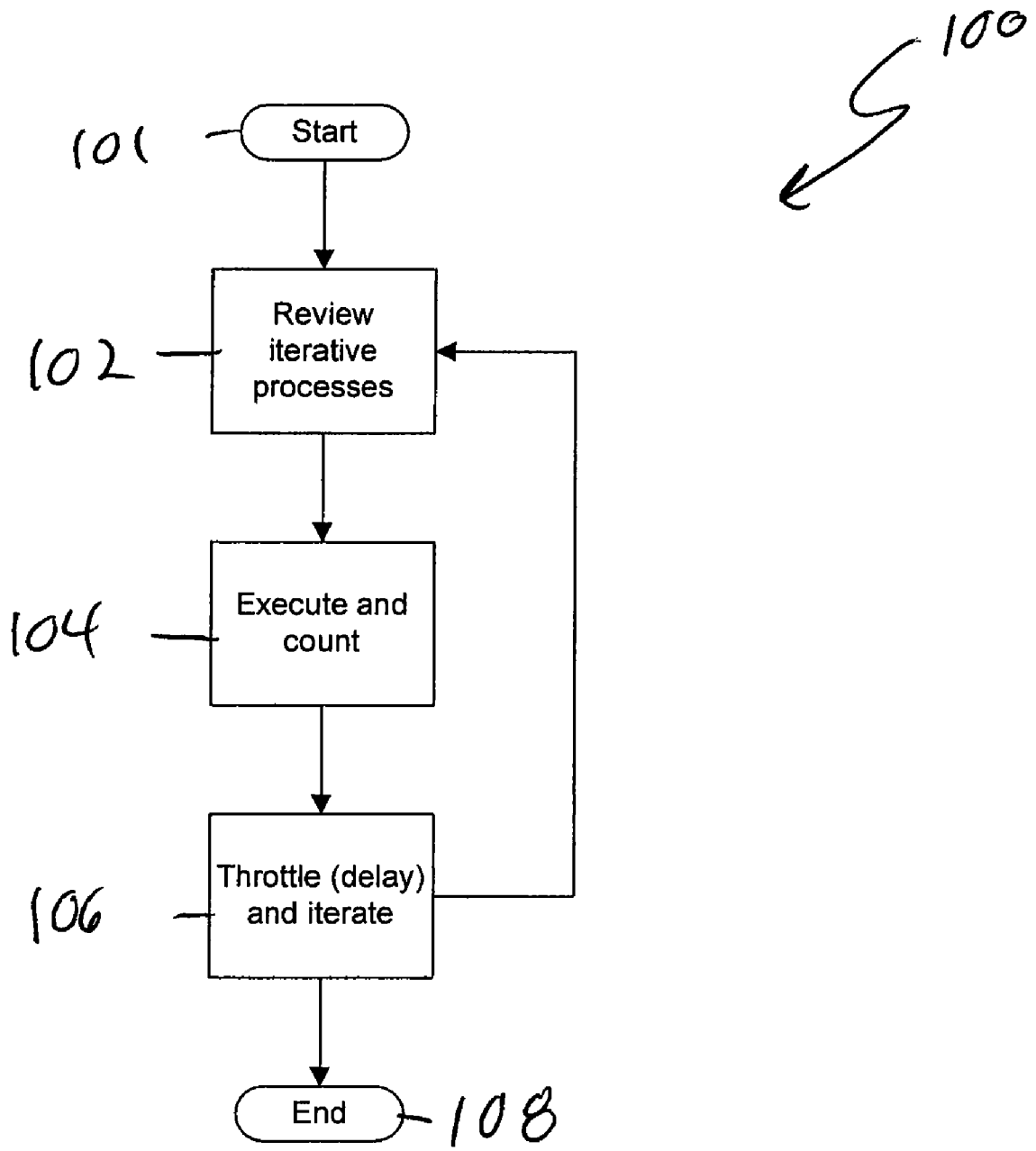
FIG. 1 is a high-level flowchart of a process according to example embodiments of the present invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical, semiconductor, or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executable and execute via the processor of the computer or other programmable data processing apparatus or platform, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

It cannot be overemphasized that an embodiment of the invention can be used in any computer system doing any kind of iterative tasks. The computer system may be used for scientific computing, statistics, finance, design, etc. For purposes of illustration, an embodiment of the invention is shown being used in a check imaging and check processing environment at a financial institution. A typical large financial institution might have many such computer systems, each one running what in banking industry parlance is referred to as an "item processing" site, or IP site. At such an IP site, the system typically checks for work to do (checks or check image files to be processed) at some regular interval. In such a case, checking for work takes some number of MIPS. If no work is found when the system checks for work, these MIPS are effectively wasted and an unproductive iteration results.

The term "bank" or the synonymous term "financial institution" and any similar terms are used herein in their broadest sense. Financial institutions that process transactions and documents of the types discussed can include stock brokerages, credit unions, and other types of institutions which are not strictly banks in the historical sense. The term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses. Moreover, even embodiments of the invention specifically for processing financial documents are not restricted to use with banks. Even retail and other service businesses, as well as manufacturers may process documents and/or data as disclosed herein. The use of terms such as bank, "financial institution" or the like herein is meant to encompass all such possibilities.

The computing platform described herein is used for processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields. Such data processing systems have historically been produced by the International Business Machines (IBM) Corporation. CIMS is today produced and marketed by Fiserv Corporation of Brookfield, Wis., U.S.A. Fiserv and their products are well-known throughout the financial services industry.

Check images and data about the checks the images represent, such as index information referring to the check images, which typically includes the MICR data, can be stored by processing systems according to any of various industry standard formats, for example, the well-known common import file format (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement.

Index information can also be stored with electronic images in an "image cash letter" (ICL) to provide for the truncation of the paper documents. Again, these systems and techniques are well known by those of ordinary skill in the financial information technology arts. A well-known industry standard format for a cash letter file that contains both images and all data necessary to index and understand the images is the X9.37i format, which is promulgated by the American National Standards Institute (ANSI).

In most large computer systems that perform iterative tasks, there is a software module that manages the processing steps for work units. Such a software module might be generically referred to as an iterative process controller. In the case of an IP site for a financial institution as described herein, this software module might be referred to as an image driver, or simply a "driver," since part of most tasks is either imaging checks, or processing images for checks, for example, images that are received from a different financial institution.

As an example, an image driver implemented without an embodiment of the invention might be designed to iterate every two minutes by reviewing the processing environment for unit of work status from various sources, noting any pending dependencies for active work units, starting the next processing step for any work units eligible, and then waiting for the two minutes prior to beginning this cycle again. In a high volume IP site such an image driver might find work units that are eligible to process during each two-minute iteration. However, in a low volume IP sites, such an image driver might look for work to do each two minutes and frequently not find any. Additionally, the frequency of finding work units to process each two minutes would typically vary for a given copy of the image driver application by day of week and hour of day.

As previously suggested, run time cost of a computer system is often measured in "MIPS", which might also be referred to as "CPU utilization." These measurements refer to computer hardware use by a software process and directly translate into the size or capacity of the computer hardware required to support all concurrent processing on the specific computer system. Over time the size and capacity required translates back to a unit cost allocated back to the processes required to pay for the acquisition and maintenance of the computer hardware itself. Thus, run time improvement can make computer software processes more efficient and reduce the cost of the computer hardware over time.

According to embodiments of the invention, functionality to throttle (or control) the iteration cycle based on a schedule that would be customized for each processing environment is included in an iterative process controller, such as in this example, the image driver. The throttling schedule can provide a separate, between iteration wait-time for each timeframe, such as an hour of the day during each day of the week.

Nonstandard timeframes can be accommodated. For example, it may be that certain periods of time would benefit from no wait time between iterations. Holidays and special processing events can also be accommodated.

In at least some embodiments, a table of critical business service level agreement (SLA) times can be stored in the system to enable the iterative process controller to override the throttling schedule for timeframes that expect a critical work item that requires immediate processing. Embodiments of the invention can also programmatically self track productive iterations to allow the throttling schedule to be updated automatically based on current processing experience.

FIG. 1 presents a flowchart showing a method of iterative process throttling in a computer system. Like most flowcharts, FIG. 1 illustrates method 100 as a series of process or sub-process blocks. Method 100 begins at block 101. At block 102, new work units to be managed and the current processing status of any work units already under management are reviewed. A new processing iteration begins and the image driver looks around to determine, based on the status of all of the units of work that it is responsible for, which unit of work has changed states. At block 104, the task or tasks connected with the work unit are executed and, a count of process starts is maintained and stored. This block is where any managed work unit that is ready for a subsequent processing step begins processing. At block 106 of FIG. 1, intelligent delay scheduling takes place, and the processing illustrated in FIG. 1 returns to block 102. This intelligent delay scheduling includes throttling and iterating, with the delay being determined, at least in part, by a throttling schedule. A throttling schedule in at least some embodiments can be simply the time to wait or delay between iterations of an iterative process, but it also may include other information, such as a number of intervals into which the wait time is to be divided for monitoring or other purposes.

Figure 2:
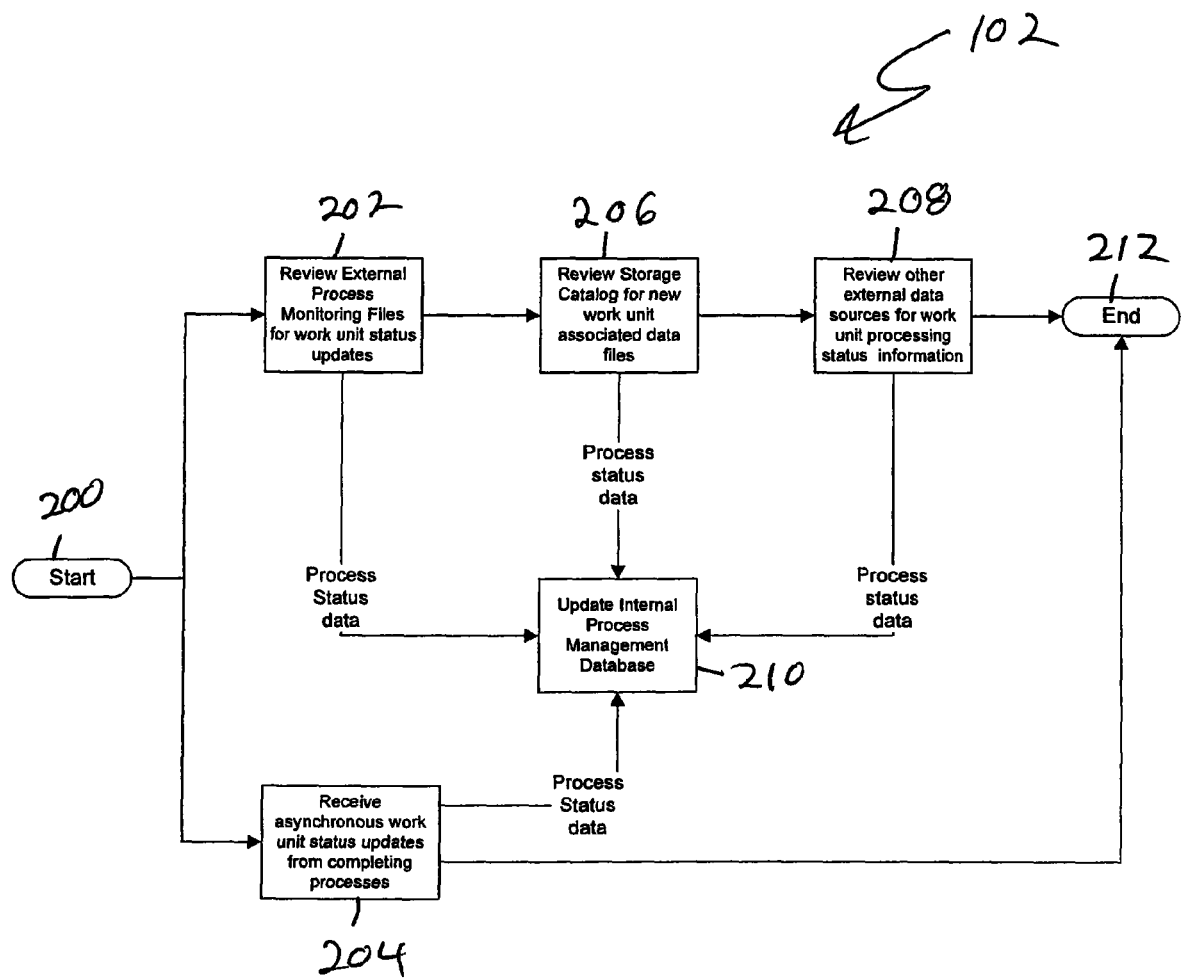
FIGS. 2, 3 and 4 are flowcharts showing more detailed sub-processes behind the process blocks of the flowchart of FIG. 1.

FIG. 2 presents a more detailed flowchart of the sub-process behind block 102 of FIG. 1. Sub-process 102 begins at block 200. Processing takes two parallel paths, one path through block 202 and another path through block 204. At block 202, work unit status is reviewed and acquired from external process monitoring status files. These files may be part of the system on which the present image driver is running, or part of a different process monitoring system. At block 206, a disk file creation search is conducted in order to review the storage catalog of the computer system for new work unit associated data files. This review can be employed to identify asynchronous process completion based on the arrival of new data files. At block 208 of FIG. 2, the accessing and review of a generic "other" category of work units is conducted to fully learn the current process of a managed work unit. This review can be one of many reviews of external sources of process information. This review can take the form of, for example, an "MQ" series message queue or an external database query.

Still referring to FIG. 2, at block 204, asynchronous work unit status updates can be received by the image driver. At block 210 of FIG. 2, information from all of the reviewing sub-processes shown is included in an internal process management database for use by the image driver. This database is used to reflect the current process status of each managed work unit so the next processing steps that are scheduled to be initiated by the iterative process controller can be executed in the proper sequence.

It should be noted that even external processes can be initiated by the iterative process controller (the image driver in this example), initiated by other processes, or initiated in other ways. These processes, which send asynchronous updates at block 204, are aware of the iterative process controller and send it processing status updates. Other processes, which might be handled at blocks 202, 206, or 208, may not send in processing status updates, but rather create data that the controller can find and use to update its status database as part of the review conducted at block 102 of FIG. 1. Sub-process 102 ends at block 212 of FIG. 2.

Figure 3:
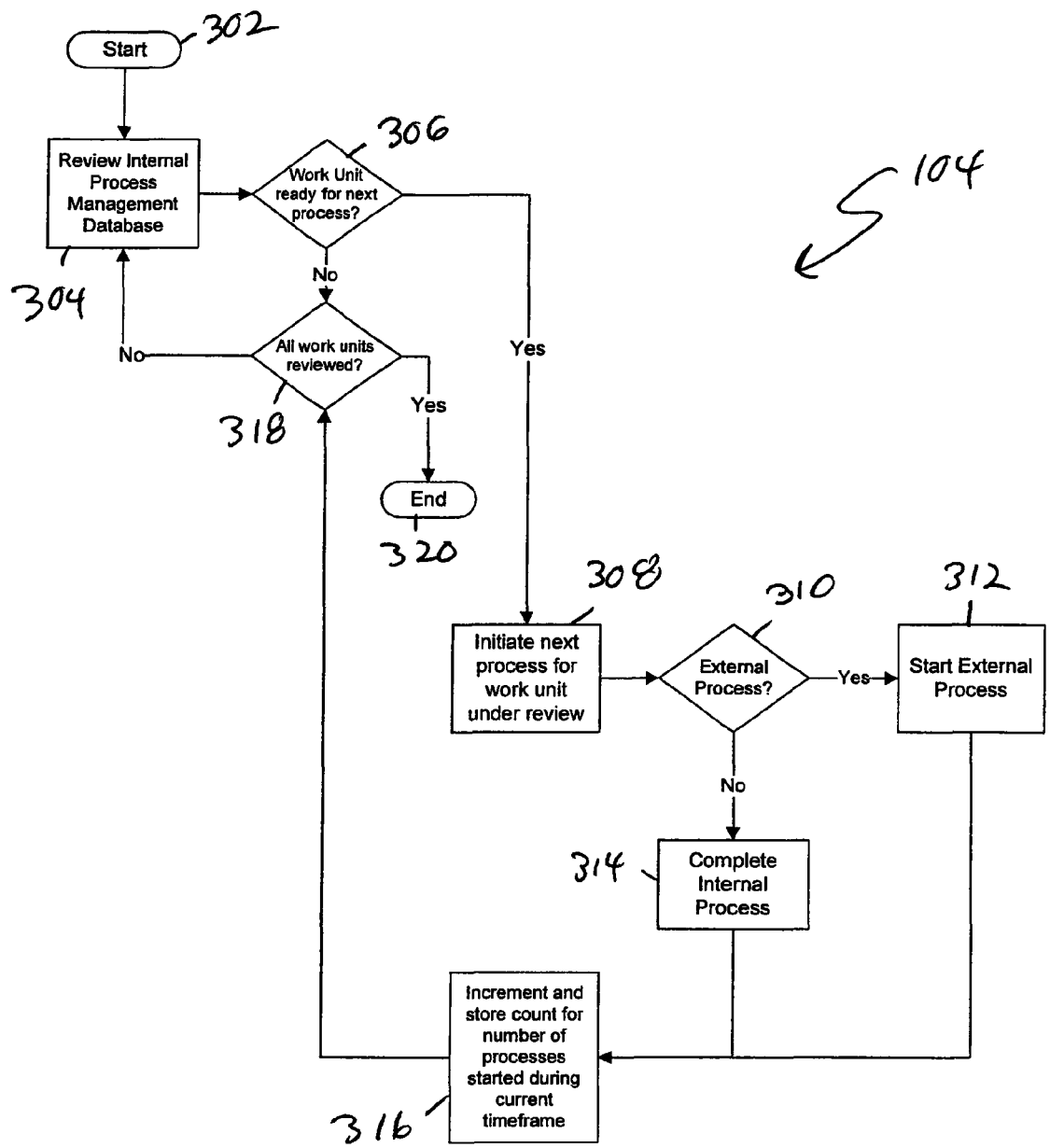

FIG. 3 is a flowchart illustrating executing and counting sub-process 104 of FIG. 1. Sub-process 104 begins at block 302, and essentially keeps track of what the image driver has decided to do. At block 304, a review is conducted of the internal process management database to determine which work units are eligible for processing. Each work unit is reviewed for action individually. When a work unit is ready for the next process at block 306, the next process for such a work unit is initiated at block 308. If the next process is external to the iterative process controller at block 310, that process is initiated at block 312. Otherwise, the initiation and completion of a process that occurs internal to the controller takes place at block 314. The count of how many times a process starts during the timeframe that has been discussed previously is incremented and stored at block 316. At block 318, a determination is made as to whether all work units have been reviewed. If so, processing ends at block 320. Otherwise, the controller sets up to review another work unit from the database at block 304.

The count that is stored at block 316 of FIG. 3 corresponds to the number of times a process starts during the current timeframe. Every time a process starts, one is added to the count. If at least one process has been started during an iteration, it can be considered productive. If an iteration is unproductive, that is, if no processes start on the iteration, the count does not change. A count is maintained for each timeframe of interest. For example, between 1:00 and 2:00 P.M. on a certain weekday, the count will keep track of how many times there was a process started and then at 2:00 P.M., the count will be stored for the number of processes started for that timeframe, while the active count maintained in system memory is reset to start counting over for the next timeframe.

Figure 4:
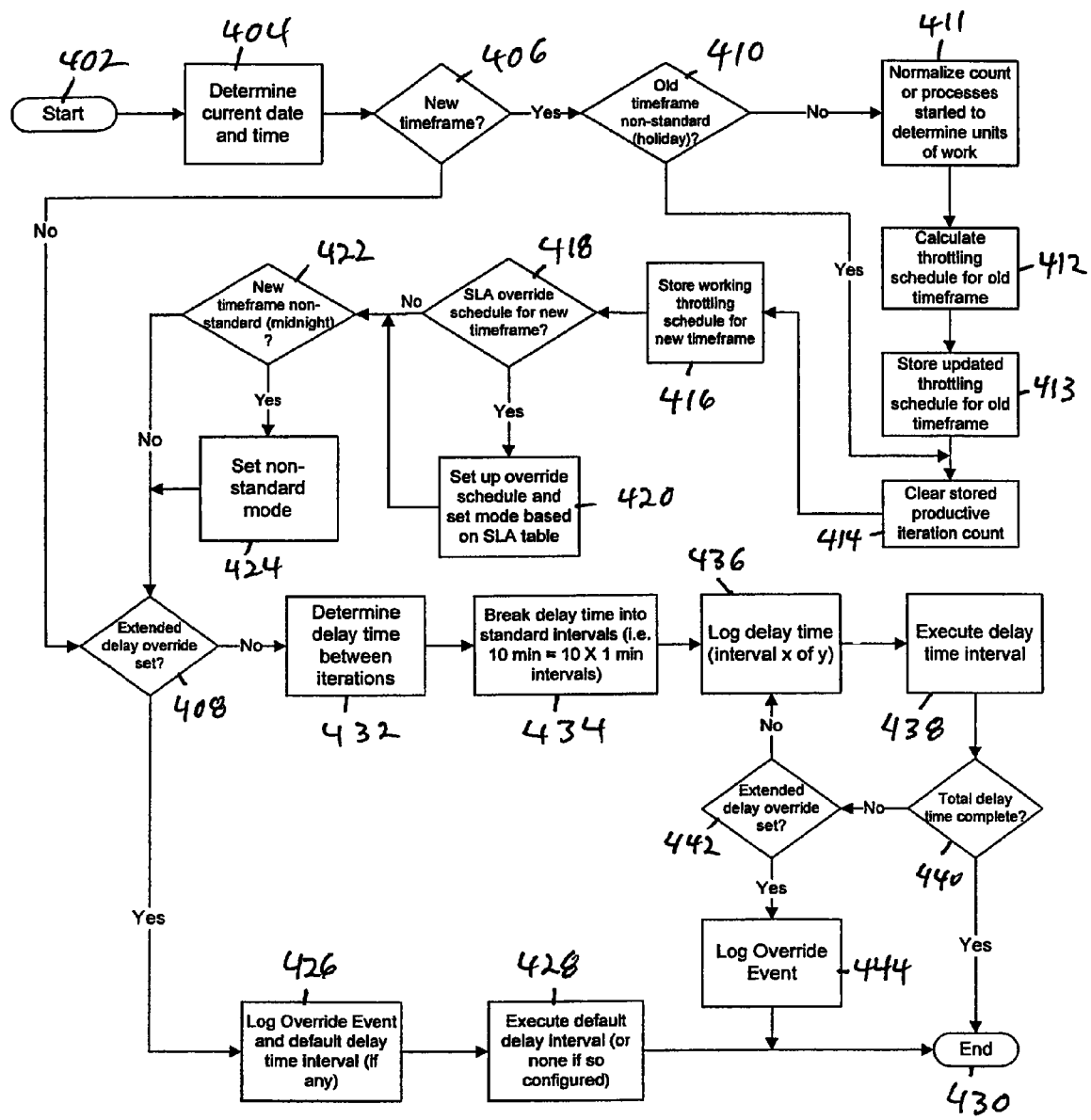

FIG. 4 presents a flowchart showing more detail of the throttling and iteration sub-process, 106, of FIG. 1. Sub-process 106 begins at block 402. At block 404, the current data and time are determined. At decision block 406, a determination is made as to whether a new timeframe is starting. If not, processing proceeds to decision block 408, and the current timeframe continues to be processed, unless there is an indication that an extended delay override has been set. Process blocks 408 and beyond will be further discussed later. If a new timeframe is starting at decision block 406, a determination is made at decision block 410 as to whether the old timeframe was a nonstandard timeframe, for example, a timeframe occurring on a holiday. If so, a new throttling schedule is not calculated and processing proceeds to block 414. However, if not, meaning the previous timeframe was standard so that an appropriate count exists, the count of process starts is normalized at block 411. In this example embodiment, the count is divided by some number, and the result corresponds to an average number of units of work during the timeframe. The appropriate number will vary depending on the nature and type of work being done by the system, but for some bank item processing sites, three has been found to work well. The throttling schedule is calculated at block 412, using the average number of units of work, which again, is the normalized, stored, count of process starts.

In order to calculate the throttling schedule at block 412 for the old timeframe, the wait time is set according to the following values. These values can be stored in a lookup table, or an equation can be derived and used. In this example, the length of a timeframe is one hour. If the number of work units in the previous timeframe was 1 or less, the wait time is set to 30 minutes; if the number of work units was 2 or less (but more than 1), the wait time is set to 20 minutes; if the number of work units was 4 or less (but more than 2), the wait time is set to 10 minutes; if the number of work units was 8 or less (but more than 4), the wait time is set to 6 minutes; if the number of work units was 10 or less (but more than 8), the wait time is set to 4 minutes; if the number of work units was 17 or less (but more than 10), the wait time is set to 2 minutes; otherwise (18 or more work units), there is no throttling, meaning the driver continuously looks for new work.

The wait time based on the stored prior throttling schedule for the old timeframe is averaged with the calculated wait time. The wait time to be used during the next occurrence of the old timeframe is then rounded down as follows to determine the working throttling schedule, which is the wait time between each look for new work units during the next occurrence of the same timeframe. If the average is less than 2 minutes, there will be no throttling. If the average is less than 4 minutes, but 2 minutes or more, the delay time will be set to 2 minutes; if the average is less than 6 minutes but 4 minutes or more, the delay time will be set to 4 minutes; if the average is less than 10 minutes but 6 minutes or more, the delay time will be set to 6 minutes; if the average is less than 20 minutes but 10 minutes or more, the delay time will be set to 10 minutes; if the average is less than or equal to 29 minutes but 20 minutes or more, the delay time will be set to 20 minutes; if the average is 30 minutes or more, the delay time will be set to 30 minutes. The newly calculated throttling schedule for the old timeframe is stored in a throttle file for use during the next occurrence of the old timeframe at block 413.

The averaging described immediately above insures that the automated delay adjustment does not cause the throttle schedule to delay iterations too much. In effect, each calculated delay is moved to the delay setting that is one faster. For example, if this timeframe's previous setting is 4 minutes, and the new setting calculates to 6 minutes based on the preceding timeframe, the working delay time will average to 5 minutes. The updated value for the next timeframe will be stepped to 4 minutes (rather than 6 minutes). However, if the current timeframe's previous setting is 4 minutes, and the new setting calculates to 10 minutes, the working delay time will average to 7 minutes. The updated value will then be stepped to 6 minutes.

Still referring to FIG. 4, at block 414 is the first step in setting the system up for a new timeframe to occur in the immediate future. At block 414 the productive iteration count is cleared for the next timeframe. At block 416, the new timeframe throttling schedule is loaded from the throttle file.

Continuing with FIG. 4, a determination is made at block 418 as to whether there is an SLA override schedule for the new timeframe. If so, the override schedule is set at block 420. In either case, a determination is made at block 422 as to whether the new timeframe is non-standard in that it encompasses a transition to or from a holiday. If so, a non-standard mode, in which the throttling schedule will not be recalculated, is set at block 424. As previously mentioned, a determination is made at block 408 as to whether an extended delay override has been set, which can be indicated by a stored extended delay override indicator. The extended delay override consists, in example embodiments of the invention, of an operator or support person manually telling the system to ignore throttling. Essentially, the extended delay override is equivalent to turning off throttling. Such an override may be necessary for troubleshooting, or because a system operator has been notified that a critical work unit needs to be processed, or any other reason. In example embodiments, the system can be programmatically set up to automatically cancel the override after some time interval, or, for example, at the next maintenance window for the system. If the override is set, the override is logged at block 426, and the pre-configured delay is used at block 428. This delay can be configured to be zero, in which case the driver continuously looks for work. The process then ends at block 430.

Still referring to FIG. 4, if there is no extended delay override set at block 408, the current delay time according to the determined throttling schedule is looked up at block 432. The delay time is programmatically divided into a number of standardized shorter intervals at block 434. In this example, one minute intervals are used, so that if the throttling schedule dictates a delay time of 10 minutes, it will also dictate that the 10 minute delay consists of 10 one-minute intervals. A status log of the delay is kept at block 436 in terms of which interval of the total number of intervals is current. At block 438, the system waits for one interval, and a determination is made at block 440 as to whether the total delay is complete. If so the processing ends at block 430. If not, a check is made again at block 442 as to whether the extended delay override has been triggered. If so the override is logged at block 444 and the processing ends at block 430. Otherwise, processing proceeds back to block 436 to handle the next interval.

Figure 5:
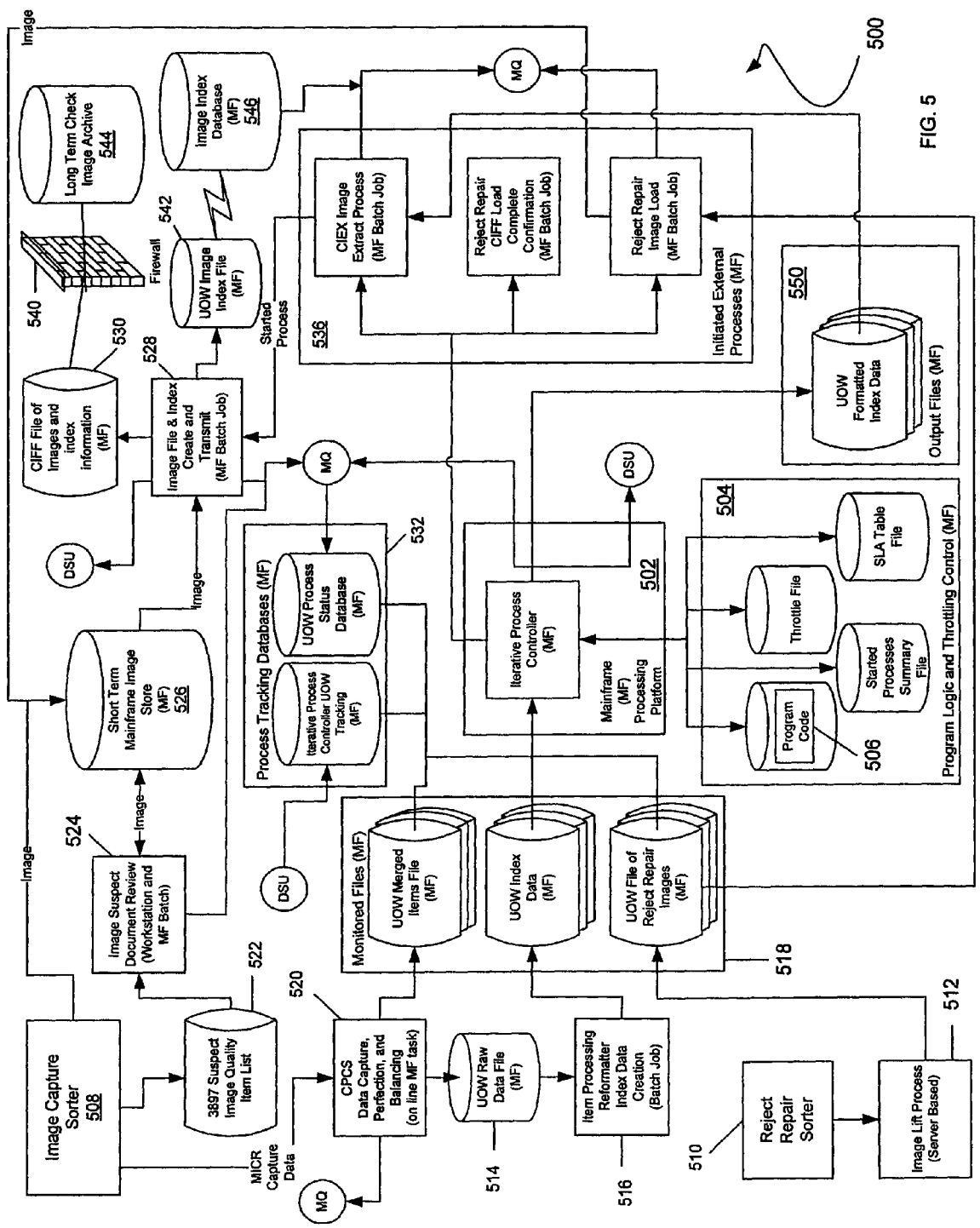
FIG. 5 is a system block diagram for example embodiments of the invention.

FIG. 5 provides detail of a system according to some embodiments of the invention. It cannot be overemphasized that FIG. 5 is an example only. Although FIG. 5 is an item processing site for a financial institution, the throttling technique disclosed herein can be used in any computer system doing any kind of work. In system 500 of FIG. 5, mainframe processing platform 502 includes a processor and memory within a mainframe computer system, and executes the iterative process controller, or driver, to monitor states of units of work (UOW), complete internal processes, and initiate external processes on an iterative cycle. If not expressly stated, any component shown in FIG. 5 that contains the indication "MF" for "mainframe" in the legend runs on this or another mainframe system in this example. Storage devices 504, associated with the mainframe processing platform, provide files to carry out the program logic and throttling control of the iterative process controller. These files include a started process summary file to store the count, timeframe, and details associated with processes that were initiated by the iterative process controller. Information from this file is used to calculate the iteration delay time. The throttle file contains the iterative process control delay time schedule for each timeframe. The SLA table file contains the SLA table previously discussed. This table includes timeframes with critical processing requirements used to override the calculated throttle delay time obtained from the throttle file. Executable computer program code 506 also resides on a tangible medium or media within a storage device for the mainframe. Instructions in the computer program code combined with appropriate computing hardware form the means to carry out an embodiment of the invention. The program code contains the executable program logic that controls the function of the iterative process controller.

Still referring to FIG. 5, image capture sorter 508 in this example is a combination IBM 3890 check reader sorter and IBM 3897 check image camera used to extract the MICR encoded data, classify, physically sort, and capture a digital image of the front and back of paper checks. Reject repair sorter 510 in this example embodiment is a low speed transport based check data capture, repair, and image camera device. This device is used to process paper checks that were determined to be reject items by the IBM 3890/3897 capture process. The reject repair sorter feeds into image lift process 512, which in this example runs on a server. This server-based process packages check images created by the reject repair sorter into unit of work (UOW) based files and transmits them to the mainframe.

Staying with FIG. 5, UOW raw data file 514 is an extract of non-normalized check MICR data in UOW batches. Item processing (IP) reformatter index creation 516 is a process that normalizes the check data to standardize it for additional processing. This batch job provides a portion of the monitored data files 518, along with CPCS data capture, perfection and balancing task 520 and the previously referred to lift process 512. The CPCS perfects data through these functions. Monitored data files 518 include specific files for which the driver monitors the mainframe storage catalog. The creation of these files will signal a state change for one or more of the units of work under management by the driver (iterative process controller). These monitored files in this embodiment include the UOW merged items file, which includes data records of the corrected reject repair items at a unit of work level, the UOW index data, which is the normalized check MICR data in unit of work batches, and the UOW file of reject repair images, which contains the check images of the corrected reject repair items at a unit of work level. This file was transmitted by the image lift process for loading into the short term mainframe store.

The 3897 suspect image quality item list 522 of FIG. 5 is a list of check items determined by the IBM 3897 check image camera process to be of questionable quality and in need of review to determine usability. Image suspect document review 524 is a process for reviewing the check images that have been determined to be of questionable quality. This process is a mainframe batch process that includes workstation based review of images to determine visual quality. Short term mainframe store 526 serves as temporary image storage. IBM 3897 image capture writes images directly to the store. Images reside in this store for use during image based processing and eventual packaging for long term archival.

Staying with FIG. 5, index file create and transmit process 528 is started by the image extract process for check image exchange (CIEX) to create and transmit the file of check index information and check index and associated digital images for long term archival. Process 528 receives a file of check index information and uses it to retrieve associated digital images to use in creating the referenced files prior to transmission. CIFF files 530 of images and information include check index information and associated digital images to be sent to the long term check image archive. Process tracking databases 532 are used by the iterative process controller for process management and control. In this example, these databases include an iterative process controller UOW tracking database to store the current state of each unit of work under management by the iterative process controller and a UOW process status database to track and display key process status indications and statistics for units of work under management by the iterative process controller.

Continuing with FIG. 5, initiated external processes 536 are initiated by the iterative process controller and execute externally, independently, and/or asynchronously from the iterative process controller itself. In this example, these external processes include the check image exchange (CIEX) image extract process, which is used to convert the UOW formatted index data into check index data compatible with the image file and index create and transmit process. This external process also breaks the UOW based files into subsets to control the size of the CIFF file of images and index information. The reject repair CIFF load complete confirmation process is used to notify the reject repair image lift process that the provided UOW file of reject repair images was loaded to the short term mainframe image store successfully. The reject repair image load process is used to load the UOW file of reject repair images into the short term mainframe image store successfully.

Firewall 540 of FIG. 5 is used to manage data flow between internal and external networks as is known in the art. CIFF file of images and index information 530 is the final version of the check image object and index combination file at a unit of work or smaller level. This file is transmitted to a long term check image archive 544 through the previously discussed firewall 540. Long term check image archive 544 is a storage area for check images. Check images are available for retrieval when needed and stored for various lengths of time based on the type on image. The range of time may be a number of days, weeks, or years. UOW image index file 542 is the final version of the image index file at a unit of work or smaller level. This file is transmitted to an image index database. Image index database 546 is a long term database containing check index information associated with all check images that have been sent to the long term check image archive. In this example, database 546 is maintained on a different mainframe. Output files 550 created by the driver include UOW formatted index data derived from the UOW image index file and long term check image archive item level retention information containing unit of work level check index data in a format compatible with the check image exchange image extract process. Circles shown on FIG. 5 indicate either a message queue (MQ) or a direct status update (DSU) as specified by the legend in the circle.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "less" or "greater" are intended to encompass the concept of equality unless otherwise expressly stated, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of throttling an iterative financial check sorting and imaging process in a computer system, the method comprising:
   executing, by a computing system, the iterative financial check sorting and imaging process;
   determining, by the computing system, a count of process starts for the iterative financial check sorting and imaging process occurring during a current predetermined timeframe;
   normalizing, by the computing system, the count of process starts by dividing the count by a number to determine an average number of units of work processed during the current predetermined timeframe, wherein the number is based on the type of work that is being done;
   calculating, by the computing system, a throttling schedule entry for the current predetermined timeframe by setting a current wait time according to a value stored in a lookup table, wherein the value is selected based on the average number of units of work processed, wherein the wait time is a delay time between iterations of the iterative financial check sorting and imaging process;
   storing, in computing system memory, the throttling schedule entry in a throttling schedule, wherein the throttling schedule includes entries for each of a plurality of predetermined timeframes;
   calculating, by the computing system, a working throttling schedule for a next-in-time occurrence of the predetermined timeframe by setting the next-in-time wait time based on an average of the current wait time and the previous wait time for the predetermined timeframe; and
   applying, by the computing system, the next-in-time wait time to throttle the iterative financial check sorting and imaging process occurring during the next-in-time occurrence of the predetermined timeframe.

2. The method of claim 1, wherein the normalizing further comprises dividing, by the computing system, the count of process starts by a predetermined average number or process starts per unit of work.

3. The method of claim 2, further comprising overriding, by the computing system, the working throttling schedule in accordance with a service level agreement (SLA) which defines timeframes with critical processing requirements.

4. The method of claim 3, wherein overriding further comprises accessing, in computing system memory, a SLA table to determine which timeframes have critical processing requirements that override the throttling schedule.

5. The method of claim 2, further comprising:
   determining, by the computing system, if an extended delay override indicator has been set; and
   overriding, by the computing system, the working throttling schedule when the extended delay override indicator is set.

6. The method of claim 5, further comprising logging, by the computing system, the overriding of the working throttling schedule when the extended delay override is set.

7. A computer program product comprising computer-readable program code embodied on a non-transitory computer-readable storage medium, the computer-readable program code executable by a computer system to implement a method of throttling an iterative financial check sorting and imaging process in the computer system, the method comprising:
   executing the iterative financial check sorting and imaging process;
   determining a count of process starts for the iterative financial check sorting and imaging process occurring during a current predetermined timeframe;
   normalizing the count of process starts by dividing the count by a number to determine an average number of units of work processed during the current predetermined timeframe, wherein the number is based on the type of work that is being done;
   calculating a throttling schedule entry for the current predetermined timeframe by setting a current wait time according to a value stored in a lookup table, wherein the value is selected based on the average number of units of work processed, wherein the wait time is a delay time between iterations of the iterative financial check sorting and imaging process;
   storing the throttling schedule entry in a throttling schedule in the computer system, wherein the throttling schedule includes entries for each of a plurality of predetermined timeframes;
   calculating a working throttling schedule for a next-in-time occurrence of the predetermined timeframe by setting the next-in-time wait time based on an average of the current wait time and the previous wait time for the predetermined timeframe; and
   applying the next-in-time wait time to throttle the iterative financial check sorting and imaging process occurring during the next-in-time occurrence of the predetermined timeframe.

8. The computer program product of claim 7, wherein the calculating of the throttling schedule further comprises averaging with a prior existing throttling schedule.

9. The computer program product of claim 8, wherein the method further comprises overriding the working throttling schedule in accordance with a service level agreement (SLA), which defines timeframes with critical processing requirements, wherein the overriding comprises accessing a stored SLA table to determine which timeframes have critical processing requirements that override the throttling schedule.

10. The computer program product of claim 8, wherein the method further comprises bypassing recalculating the throttling schedule based on a non-standard timeframe.

11. The computer program product of claim 8, wherein the method further comprises:
   determining if an extended delay override indicator and overriding the throttling schedule when the extended delay override indicator is set.

12. The computer program product of claim 11, wherein the method further comprises logging the overriding of the throttling schedule when the extended delay override is set.

13. Apparatus for throttling an iterative financial check sorting and imaging process in a computer system having a processor, the apparatus comprising:
   means for executing the iterative financial check sorting and imaging process;
   means for determining a count of process starts by the iterative financial check sorting and imaging process occurring during a current predetermined timeframe;
   means for normalizing the count of process starts by dividing the count by a number to determine an average number of units of work processed during the current predetermined timeframe, wherein the number is based on the type of work that is being done;

means for calculating a throttling schedule entry for the current predetermined timeframe by setting a current wait time according to a value stored in a lookup table, wherein the value is selected based on the average number of units of work processed, wherein the wait time is a delay time between iterations of the iterative financial check sorting and imaging process;

means for storing the throttling schedule entry in a throttling schedule in the computer system, wherein the throttling schedule includes entries for each of a plurality of predetermined timeframes;

means for calculating a working throttling schedule for a next-in-time occurrence of the predetermined timeframe by setting the next-in-time wait time based on an average of the current wait time and the previous wait time for the predetermined timeframe; and means for applying the next-in-time wait time to throttle the iterative financial check sorting and imaging process occurring during the next-in-time occurrence of the predetermined timeframe.

14. The apparatus of claim 13, further comprising means for overriding the working throttling schedule in accordance with a service level agreement (SLA), which defines timeframes with critical processing requirements by accessing a SLA table to determine which timeframes have critical processing requirements that override the throttling schedule.

15. The apparatus of claim 13, further comprising means for bypassing recalculating the throttling schedule based on a non-standard timeframe.

16. The apparatus of claim 13, further comprising:
means for determining if an extended delay override indicator has been set; and
means for overriding the throttling schedule when the extended delay override indicator is set.

17. The apparatus of claim 16, further comprising means for logging the overriding of the throttling schedule when the extended delay override is set.

18. A system including throttling of iterative financial check sorting and imaging processes executed by the computer system, the system comprising:
a processing platform to execute the iterative financial check sorting and imaging processes,
calculate a throttling schedule entry for a current predetermined timeframe by setting a current wait time according to a value stored in a lookup table, wherein the value is selected based on an average number of units of work processed for the iterative financial check sorting and imaging process during the current predetermined timeframe, wherein the average number of units of work is based on a count of process starts for the iterative financial check sorting and imaging process occurring during the current predetermined timeframe, wherein the wait time is a delay time between iterations of the iterative process, and
calculate a working throttling schedule for a next-in-time occurrence of the predetermined timeframe by setting the next-in-time wait time based on an average of the current wait time and the previous wait time for the predetermined timeframe; and
at least one storage medium connected to the computing platform to store the throttling schedule for storing a throttling schedule entry for each of a plurality of predetermined timeframes, a service level agreement (SLA) table that defines timeframes with critical processing requirements that require throttling schedule overriding, and a started processes summary file including a count of the number of the process starts for the iterative financial check sorting and imaging process.

19. The system of claim 18, wherein the processing platform is further operable to normalize the number of process starts to determine the number of units of work processed.

* * * * *